Dec. 5, 1939.    J. LOUMIET Y LAVIGNE    2,182,566
CENTRIFUGAL RECTIFICATION
Filed July 13, 1937    5 Sheets-Sheet 1

INVENTOR.
JEAN LOUMIET Y LAVIGNE
BY
ATTORNEYS

Dec. 5, 1939. J. LOUMIET Y LAVIGNE 2,182,566
CENTRIFUGAL RECTIFICATION
Filed July 13, 1937 5 Sheets-Sheet 4

INVENTOR
JEAN LOUMIET y LAVIGNE
BY
ATTORNEYS

INVENTOR
JEAN LOUMIET y LAVIGNE
BY
ATTORNEYS

Patented Dec. 5, 1939

2,182,566

UNITED STATES PATENT OFFICE 2,182,566

CENTRIFUGAL RECTIFICATION

Juan Loumiet y Lavigne, Playa de la Teja, Itabo, Cuba

Application July 13, 1937, Serial No. 153,371
In Cuba December 19, 1936

7 Claims. (Cl. 202—40)

This invention relates to distillation, especially to a process of distillation by centrifugal separation, such as that disclosed in my co-pending application, Serial No. 99,317, filed September 3, 1936, for Separators, and more particularly to a process for separating from each other the condensates of vaporous products resulting from evaporation of the liquid subject to distillation.

A characteristic of such a process is that condensations are effected within the bore of a helical tubular coil through which the vapors are caused to flow at a high velocity and since the component vapors are condensed continuously, separately and successively in an order inverse to that of their volatility, they are separated from each other by centrifugal force as they become condensed, and are caused thereby to seek the more remote walls of the helical tube, whence their extraction is accomplished by drains supplied at suitable intervals.

It is the general object of the present invention to provide certain improvements in the aforesaid separation by centrifugal force of the liquids which are formed progressively in the condensation of a mixture of vapors, by utilizing for that purpose more effectively the mechanical entrainment produced by centrifugal force; also to set forth a new means for rectification designed to be substiuted for the conventional practice in rectifying by the conventional process known as "bubbling".

Another object is to simplify and amplify the features of the present application by the provision of improved means for circulation of the vaporous products with great velocity within a coil which is curvilinear in part at least; also to provide for the extraction at intervals of the condensate, as already foreshadowed: and finally to provide for the introduction of a rectifying liquid, by injection, or by inspiration under the action of the flow of vapor, thereinto, thus producing, in the helical tube, atomization of said liquid by the vapor stream, and thereby bringing about the intimate contact of both fluids, which causes the rectification.

Other objects and features of the invention will appear as the description of the particular physical embodiment selected to illustrate the invention progresses.

In the accompanying drawings, like characters of reference have been applied to corresponding parts throughout the several views which make up the drawings, in which.

Figure 15:
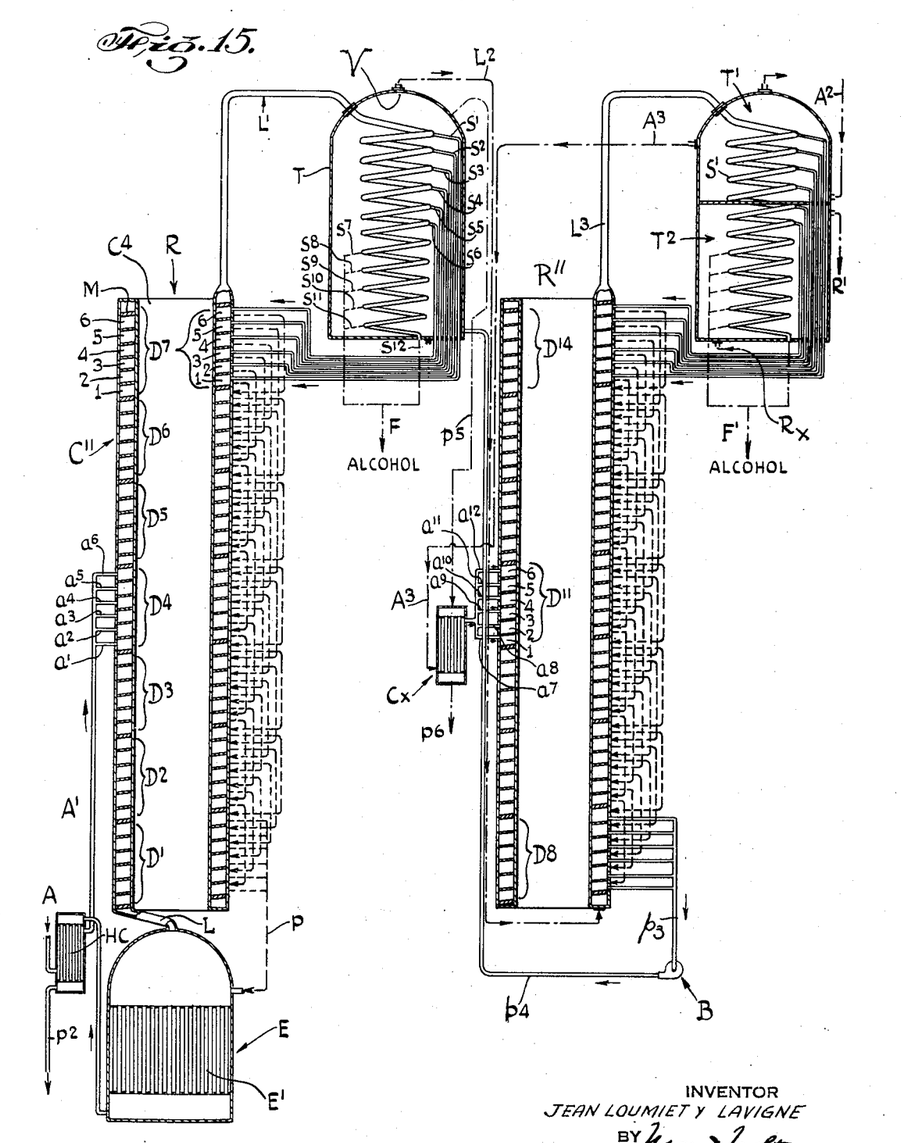
Fig. 15 is a schematic representation in vertical section of such an apparatus, substantially in its entirety.

In a now preferred embodiment of the invention selected for illustration and description and referring first to Figs. 1 to 15, vaporous products of the liquid to be distilled are caused to flow at high velocity through a stationary centrifugal separating coil S contained within a tank T which receives liquid to be distilled and is operated at a lower pressure than that of the vapors, these being condensed in the coil S in such a way that the condensation of that vapor causes the evaporation of the liquid contained in T, and the last-named vapor is delivered from the tank T through a tube, as L2, connected at V to the upper part of the tank (see Fig. 15).

The stream of vapor under condensation in the coil S is derived from a suitable source, preferably from such a boiler as that shown at E in Fig. 15, in which a pressure is maintained sufficient to create the desired high velocity of the fluid stream in tubes L and L′ and in the coils in series therewith, including the rectifying coils D′—D7 and the separator coil S to be described more at length.

Figures 1, 2, 3, 4, 5, 6, 7, 8, 9, 10, 11, 12, 13, 14:
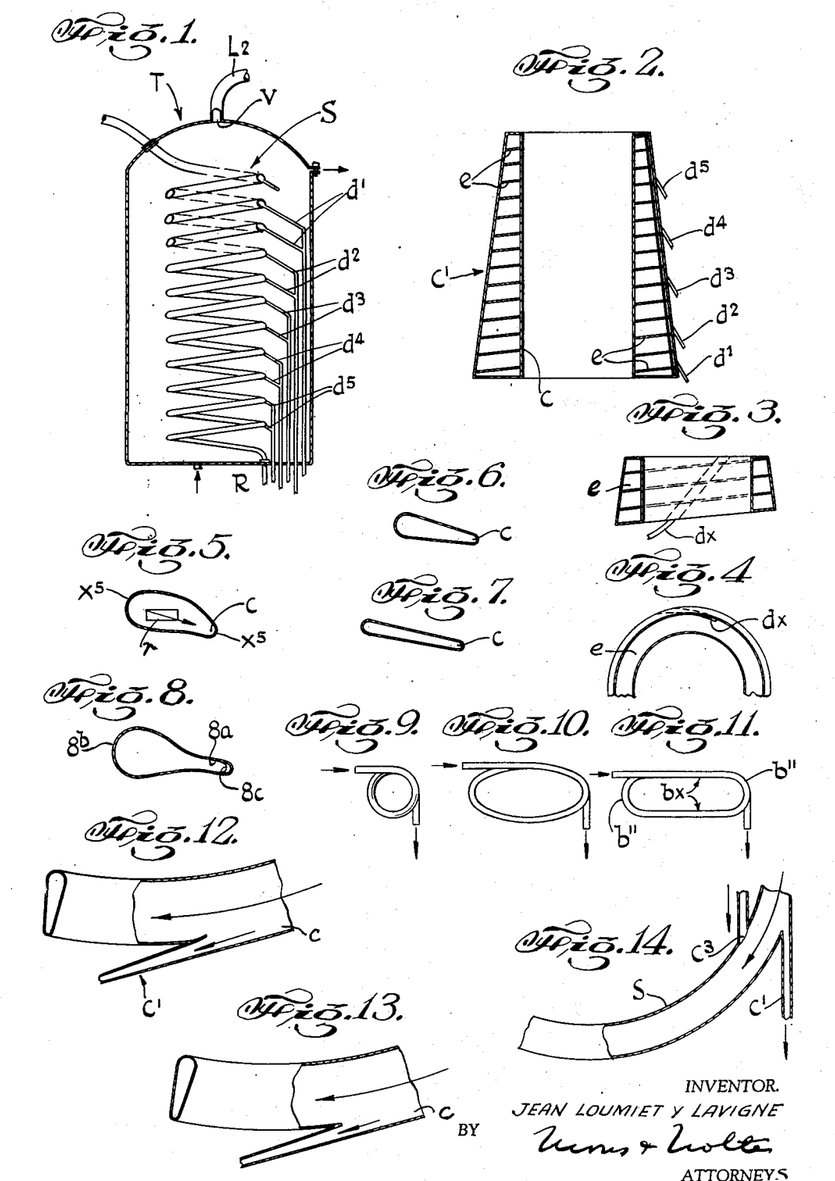
Fig. 1 is a view of a schematic character in vertical sectional elevation of a centrifugal separation coil for use in carrying into effect the novel process of distillation herein disclosed.
Fig. 2 is a similar fragmentary view in detail of a coil of modified structure embodying the invention, and showing separately a separating coil in which the vapor circulates from below upwardly, viz., in a direction contrary to the motion of the vapor in the form shown in Fig. 1.
Fig. 3 is a fragmentary, detail view of means for extracting the liquid condensed and separated in a coil of the type shown in Fig. 2.
Fig. 4 is a fragmentary, detail view in plan of the parts shown in Fig. 3.
Fig. 5 is a fragmentary, detail view in cross-section of a tube, the bore of which is formed with a cross-section to be described; this figure showing also a diagram of forces.
Fig. 6 is a similar view of a modification in the sectional area and arrangement of a tubular element of the type shown in Fig. 5.
Fig. 7 is a similar view of another modification.
Fig. 8 shows still another modification.
Fig. 9 is a fragmentary, detail view showing a typical circular convolution of a coil of the preferred type herein disclosed.
Fig. 10 is a fragmentary detail view showing an oblong coil for the same purpose.
Fig. 11 is a fragmentary detail view of another modification.
Fig. 12 is a fragmentary, detail view in side elevation on an enlarged scale of a portion of the helical tube shown in Fig. 1.
Fig. 13 is a like view of a modification.
Fig. 14 is a schematic representation of part of a system of rectification in the construction of which the present invention has been embodied.

In the form of separator shown in Fig. 1, the vapors travel downward and the cooling liquid travels upward. The liquid condensed in the upper convolutions, which liquid is the less volatile condensate, is extracted through the two drains $d'$, and thereafter the more volatile liquids, condensed successively in the convolutions of coil S, are extracted successively through drains $d2$, $d3$, $d4$ and $d5$, there being shown a pair of each of said drains, by way of illustration, although any desired number of drains may be provided, and one drain may serve a plurality of convolutions, as illustrated at $dx$ in Figs. 3 and 4.

The last-named figures, and Fig. 2, illustrate a type of stationary centrifugal separator coil which differs from that shown in Fig. 1 in the respect that it is fabricated out of a metallic strip $e$ wound between a cylindrical column C and an outer crown C′ constituted by the frustum of a cone, the strip being perpendicular to the conical wall and dividing the conical, annular space C—C′ into a continuous helical space having a cross-sectional contour of approximately trapezoidal form, constituting the separating coil through which the vapor to be condensed and separated flows from below upwards. Said coil is placed inside a cooling tank (not shown), such as T (see Fig. 1), which as indicated receives the cooling liquid or fluid at its upper part, and discharges at its lower part.

The condensate produced as above described, may be extracted desirably by one or more spoonlike devices, shown illustratively in Figs. 3 and 4, in which the spoon devices, designated in those figures generally by the reference character $dx$, each collects liquid condensate from one or more convolutions of the coil and empties them exteriorly by means of drains $d1$, $d2$, $d3$, $d4$ and $d5$, as shown in Fig. 2, so that separation is thus effected of the successive products of condensation of the vapors which circulate within the coil of Fig. 2.

Reverting now to the Fig. 1 form of separating coil, the same may be fabricated with convolutions of different cross-sectional forms, as illustrated by way of example in Figs. 5, 6, 7 and 8.

Each of these cross-sectional forms shares the common characteristic that their major axes are elongated in a direction slightly more upright than the resultant of the centrifugal and gravitational forces acting upon the circulating fluid; and at the outward inferior end of each there is formed a small channel, as $c$, designed to collect the liquid condensate and adapted to conduct it to the extracting drain.

In Fig. 5, this resultant appears at $r$ in the diagram of forces enclosed within the typical cross-section of the tube there illustrated, being defined by the arrow, and the major axis being defined by the line $x5$—$x5$.

In Fig. 8, the small channel $8a$ is shown as deepened and narrowed, with respect to the bulb-shaped portion $8b$ of the tube, and the reference character $8c$ designates a typical rugosity, which, in multiple, provokes a substantial degree of friction between the fluid and the walls of the channel, the heat so generated tending to evaporate, and so to rectify, the liquid being collected.

At the same time, by virtue of the expenditure of energy incidental to the above generation of heat, the vapor inside the coil is cooled and, in consequence, is condensed; which also represents a rectification.

The process thus explained is disclosed, and is covered by claims, in my co-pending application for United States Letters Patent Serial No. 116,333, filed December 17, 1936, for Fluid separation and refrigeration, in which it is carried into effect by means differing from those herein disclosed.

In Figs. 9, 10 and 11, various coil formations are illustrated, which may readily be understood from a brief description, as follows:

Figs. 9 and 10 show in plan examples of totally curvilinear coils; that of Fig. 9 being circular and that of Fig. 10 being elliptical; i. e., having a variable radius; and this curvilinear arrangement may desirably include a disposition in which the coil is defined by a successively decreasing radius of curvature (not shown).

Fig. 11 represents a coil characterized by end portions $b11$, of curvilinear form, joined by straight intermediate portions $bx$. In this form, the fluid is cooled and condensed principally in the straight portions of the coil, while the separation of liquids is effected in the curvilinear portions of the coil.

The desirable length of each straight portion, and the extent and radius of curvature of each curvilinear portion, may be readily determined by suitable calculation, taking into account as factors the heat-exchange required for condensation of the liquids separable from the vapor stream in a combined stream of condensates, on the one hand, and the requirements for concurrent separation from each other of the liquid constituents of said condensate stream, on the other hand.

The extent of a curved portion, for example, may be in excess of 180°, and may be of the order of, say from 1½ circumferences to 2½ circumferences.

If it is desired to limit the function of the curvilinear portions to effect separation of the products condensed in the straight portions, the curvilinear portions may be insulated, in order to prevent the transmission of heat through their walls, and each of the curvilinear portions may be provided with several drains (not shown), in order to separate more effectively the liquid constituents of the stream condensed in each anterior straight portion.

The construction of the drains or extracting devices can also be varied as desired and found suitable; but in Figs. 12 and 13, drains are shown which are of preferred form, the drain $c'$ being constituted by a prolongation of the small collecting channel $c$.

That small channel can be interrupted immediately after the start of the drain in the form of Fig. 12, to make the collection more effective; but the arrangement shown in Fig. 13 renders such interruption unnecessary and avoids the loss of pressure due to the obstacle to flow of fluid which results from interruption of the small channel.

Such means of extraction are described more at length, and claimed, in my U. S. Patent No. 2,015,076, dated September 24, 1935.

Fig. 14 illustrates in schematic form means for carrying into effect the novel process of rectification in distillation by centrifugal separation which characterizes the present invention. The unitary operation which is designed to displace the "bubbling" action in conventional distillation columns, comprises essentially the operation of causing the vapor which is to be rectified to flow at high velocity through the successive convolutions of a separating coil for fluids, and concurrently to inject rectifying liquid into said stream of vapor flowing in the coil or to cause the rectifying liquid to be inspired into the stream of vapor by the inherent suction caused by the velocity of the stream.

The rectifying liquid thus introduced is atomized or nebulized by the impact of the vapor and is commingled therewith in this finely divided condition, which is highly favorable to the rectifying operations. Rectification is, in fact, effected by such admixture, and the resulting liquid is separated and collected, by virtue of the centrifugal force, in the small collecting channel of the coil, as has been above set forth in describing the operation of distillation.

It will be noted in Fig. 14 that the rectifying liquid is introduced at $c3$ into the upper part of a convolution S, and at the side thereof nearer to the axis of the coil, and the separation by centrifugal force is effected, as at $c'$, at the lower, opposite side of the convolution; and, as shown in Fig. 14, the introduction of rectifying liquid for a new rectification is represented as following the extraction of liquid coming from a preceding rectification operation.

The separating coil has been illustrated as totally curvilinear; but such a coil may be partially straight at the places where the finely divided liquid is mixed with the vapor stream, i. e., for the rectification operation proper; but it must be at least partially curvilinear, in order to separate the liquid from the circulating vapor in the curvilinear portions after each rectification.

The process herein described is preferably carried out according to the conventional practice by virtue of which the liquid to be distilled constitutes the dominant rectifying liquid, flowing in a direction opposite that of the vapor being rectified, and which in conventional rectification columns spreads over the successive distillation plates, with the result that, by reason of the successive contacts between both circulating fluids in the course of such counterflow thereof, the more volatile components of the liquid are interchanged for the less volatile components of the vapor.

In the present method, the liquid of the first condensation from vapors effected in the rectification column itself, are utilized, when extracted therefrom, to act as rectifying liquid in like operations which are performed in the upper part of the column.

Figure 16:
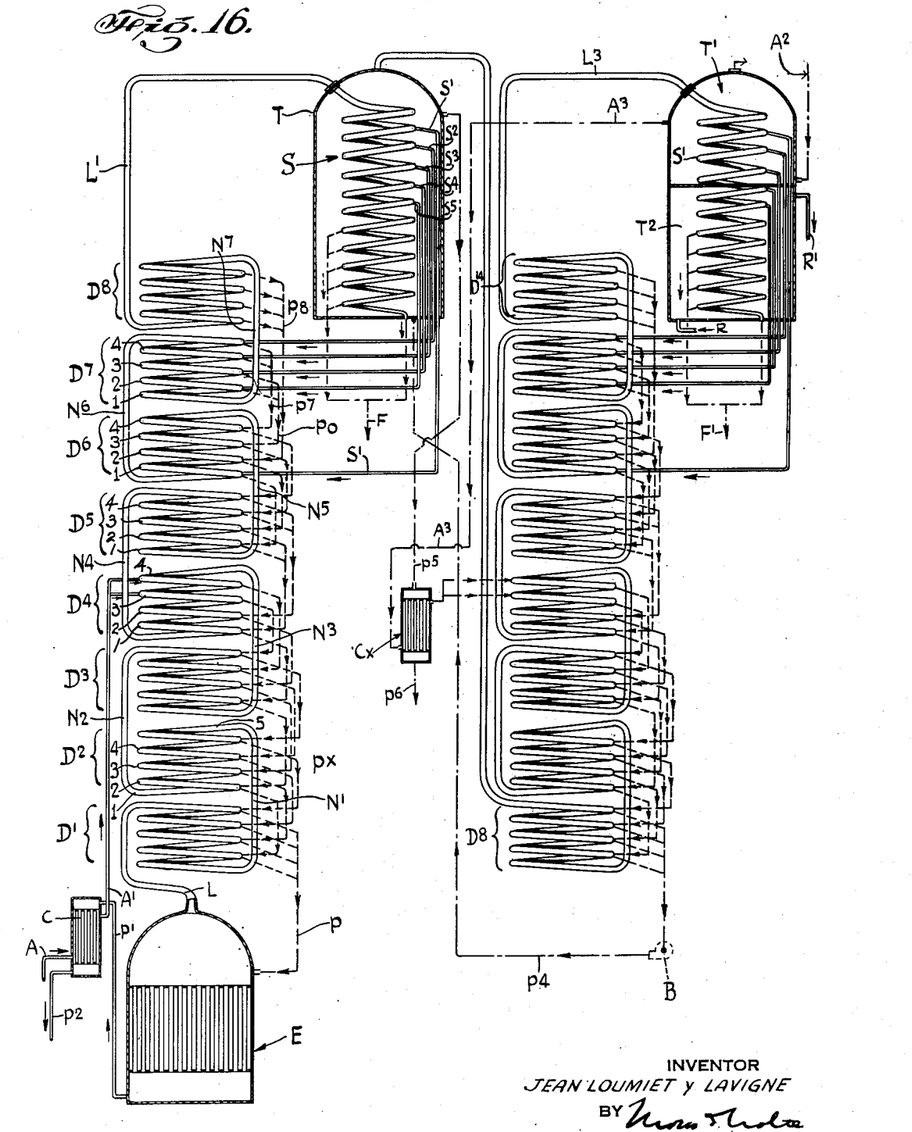
Fig. 16 is a like view of a modified form of such an apparatus.

Having thus illustrated and described, in its broader and more generic aspect, the novel process of the present invention, and certain structural elements adapted to carry into effect the steps involved in said method, I will now describe with suitable detail two examples of apparatus having elements fully organized and coordinated for the commercial distillation, rectification and separation of liquids according to my present invention, the same being illustrated in Figs. 15 and 16.

In general, the apparatus is represented as particularly adapted for the distillation of alcohol; in which the problem consists in separating the alcohol and ethers on the one hand; and on the other hand the water, and oils less volatile than the alcohol.

The apparatus is illustrated as of the double effect type, viz., adapted to utilize the latent heat of evaporation of the alcohol, which is rectified in a first column, in order to distill, at a lower pressure, a liquid of equal composition and to rectify it in a second column.

In the apparatus shown in Fig. 15 the rectifying column designated generally by the reference character R is fabricated with a cylindrical crown C4 surrounded by a helically wound metallic strip M of uniform width wound upon the crown C4 and which is confined by an exterior cylindrical wall C'', thus forming a column with a tubular peripheral helical coil of substantially rhomboidal cross-section.

In Fig. 15, in order to facilitate the understanding of the drawings, the convolutions of said helical coil have been divided into seven successive groups, each made up of six consecutive convolutions, and the groups are designated respectively by the reference characters $D'$-$D7$, reading upwardly from the bottom.

In Fig. 15 is a tank E, heated by suitable means, such as steam in the radiator E', where the evaporation of the (exhausted) liquid which comes out of the column R, through a vent tube $p$, is produced. The vapor produced in E goes out through the tube L which carries it to the bottom of the rectifying column, and the vapor flows at the desired high velocity, engendered by the pressure in E, through the six convolutions in each of the seven groups of said column; then passes over through the tube L' and downward through the condensing coil S which is contained in a cooling tank T, this structure being identical with that already described with reference to Fig. 1.

In the coil S the successive drains $s'$—$s''$ separate gradually more volatile liquids, and the first six extractions of liquids therein condensed, corresponding to the drains $s'$—$s6$, are utilized to make up the first rectified liquid of the rectifying column; for which purpose the drain $s6$, which is the last in order relatively to the flow stream of vapor, and which extracts the more volatile liquid, is connected with, and injects its liquid into, the convolution #6 of the group D7, namely the last convolution of the column considered with relation to the flow upward of vapor in the rectifying column.

The other drains, s5—s1 inclusive, respectively inject their liquids into the convolutions Nos. 5, 4, 3, 2 and 1 of the same group D7. In turn, the liquid separated in each of the convolutions of the group D7 is utilized in the convolution of like order in the anterior group D6 for the rectification operation in that convolution, for which purpose the drains which lead from each of the convolutions of D7 inject their conveyed liquid into the inward side of the convolution of like order in the group D6.

In the same manner, the convolutions of group D6 feed the liquids therein condensed and separated, into the convolutions of like order in the anterior group D5 for rectification of the vapors circulating in the convolutions thereof.

In group D4 the circulating vapors are rectified not only by the liquids which come from the corresponding convolutions of group D5, but also by the supply of liquid which is first supplied at A. Thus the feeding tube A' supplies the tubes a' to a6 inclusive, which respectively feed rectifying liquid to the corresponding convolutions of the group D4, prior to the injection thereinto of the liquids separated in the corresponding convolutions of group D5.

The rectifications in the convolutions of D3 are effected by injection into each of them of the liquids separated in the convolutions of like order in group D4; and in the same way group D3 feeds group D2, and group D2 feeds group D1, from which latter the liquids separated therein are discharged through the pipe p into the tank E, where the volatile compounds which they may contain are evaporated, and from which the exhausted liquids are withdrawn into the heater HC, the heat thereof being utilized to heat the liquid to be distilled. The latter is supplied to heater HC by the feed pipe A and is delivered therefrom through pipe A1 to feed the group D4 convolutions a'—a6 inclusive, by branches a' to a6 inclusive, as already described.

The spent liquid from HC is vented through the pipe p2.

It may be noted that for the tank E, two tanks (not shown) might be substituted, one above the other, and through both of which the exhausted liquid delivered by pipe p will flow downwardly. Only the lower tank would then be heated, as by steam, and in it the boiling of the exhausted liquid would be carried on, the resultant vapors being injected into the upper tank of this series, thus effecting a first rectification, in accordance with known practice in the art of distillation.

The drains s7—s11 inclusive of the separator condensing coil S provide the definitive products of the distillation, and these may be extracted, as at s12, in their mixed condition, as also illustrated in Fig. 12, which has been described above, or they may be collected separately; since the last separated liquids are more volatile than those first separated, and in alcoholic distillation they contain the components known as ethers.

Tank T constitutes the evaporating tank for the second column, the vapors from tank T being delivered through the top orifice V to the tube L2 and thence carried to the bottom of the second column, R'', which is of similar structure to the one already described, having a peripheral coil whose convolutions are divided into groups D8—D14 inclusive from bottom to top. There a pipe L3 leads them to the separating coil S1 contained in a tank having an upper compartment T1 and a lower compartment T2.

The upper compartment contains the first five convolutions of the coil S1, and the lower compartment contains the remaining convolutions. Part T1 is cooled by the passage of the liquid to be distilled, which is delivered at the bottom of this part by conduit A2, goes out at a higher level on the opposite side through conduit A3, and is carried thereby to a heater Cx, operated and heated like heater HC of the first column.

The part T2 is cooled by water fed into its bottom at Rx and the water is led from the top of part T2 by conduit R1 for final disposition or further utilization.

The six drains through which the condensed liquids separated in the first convolutions of coil S1—as in the case of the anterior column, deliver the liquid product of the last rectifications of the vapor rectified in this second column; and the other liquids extracted from the coil constitute definitive products, as for example the alcohol, drawn off at F1.

The exhausted liquids which come from the extraction of group D8 through pipe p3 are pumped, as by a pump B, through pipe p4, to feed tank T, and the residual liquids are withdrawn from the bottom of T through pipe p5, and carried to heater Cx, after which they are vented through pipe p6.

The feeding liquid, namely, that to be distilled in this second column, it will now be understood has been heated in tank T', and delivered therefrom through tube A3 to heater Cx, where its heating is finished, and thence it passes through tubes a7—a12 to feed the successive convolutions 1–6 of group D11.

It is to be noted that the rectifying column can be utilized in many ways different from the one described; varying the manner of feeding the rectifications in the successive convolutions by liquids extracted from the highest convolutions; also, each convolution may receive all of the liquid extracted from a preceding convolution.

It is essential, however, that the liquid to be distilled shall penetrate the column at about its middle, higher or lower according to whether the proportion of volatile products which it contains is greater or less, this liquid constituting the principal means for rectification in the inferior convolutions; also that the rectifications in the superior convolutions shall be fed by liquid derived from condensation of vapors in the first convolutions of the condensing coil, the liquid wherefrom is injected into those upper convolutions of the column, and thence descends through the other convolutions in a direction contrary to that of the flow of vapor.

One or more of the last convolutions of the coil may be used only as separators, that is, without the injection thereinto of liquid; and they may be used only to complete the separation of the liquid which may be entrained in the vapor being rectified. They can also be cooled slightly, partially or totally, to condense in them the less volatile part of the vapor, thus effecting a rectification of the same.

It should be understood further that all the dimensions, the number of convolutions in the column, and the proportion of those which are dedicated to given functions, can be varied according to the necessities of particular installations embodying the invention; and the drawings are to be considered as schematic and designed to facilitate the understanding of the manner in which the invention may be applied.

The rectification apparatus which has been described can be modified by changing the form of the coil, modifying the exterior and interior walls of the column; by replacing the column with a tubular coil, i. e., a tube formed helically and through which the vapor stream flows upwardly and which can have in cross-section such various shapes as those particularly illustrated in Figs. 5, 6, 7 and 8. A descending flow of vapor can also be utilized with advantageous results under suitable conditions.

In Fig. 16 is illustrated a distillation and rectification apparatus in which the operations of rectification are performed upon a descending stream of vapors, this modification of the apparatus following in general structure the form already described with reference to Fig. 15, and being likewise of the double effect type as already defined.

In this modification the rectifying columns alone are changed and each column is fabricated with eight coils, each comprising five convolutions, the last convolution being incomplete.

The coils of the first column are designated D1—D8 inclusive, from the bottom upward, and the vapor produced in a boiler E, identical in structure with that in Fig. 15 designated by the same reference character, and already described, is delivered under high pressure to the upper part of coil D1, flowing at high velocity downward through said coil, receiving in each convolution an ever richer liquid to be rectified, and, after such rectification in each convolution, separating the residual or resultant liquid which, in the case of coil D', is extracted by branches of the pipe p which returns the liquid to E.

The vapor stream, after traversing coil D1, rises through the upright connecting pipe N1, to the convolution 5 of coil D2 and is rectified as already indicated with respect to coil D1, the liquid from each convolution of coil D2 being conveyed to a convolution of like order in the coil D1, as by the connecting ducts px.

Thus successively, flowing through each coil in a downward direction, and then up to the next coil through one of the risers N2—N7, the vapor is finally discharged through pipe L1 to the separator coil S in tank T of Fig. 16, the parts of which are identical in general structure with the similarly designated parts of Fig. 15.

From the upper convolutions of coil S, the drains s2 to s5 inclusive extract the liquids separated in coil S and deliver them to convolutions in coil D7, the convolution 4 of the latter receiving liquid from drain s2, while other deliveries are made in the order s3 to 3; s4 to 2; and s5 to 1; these liquids being utilized in the column as primitive liquids in rectifications at the upper part of the column.

Coil D8 does not receive any injection, and its only function is to separate the liquid which may be entrained in the rectified vapor. It may be slightly cooled exteriorly, being imperfectly insulated, so that a slight rectifying condensation supervenes therein. The liquids separated in coil D8 supply the rectifying convolution 2 in coil D6 through duct p8, and the drain s1 delivers to the convolution 1 of the same coil D6 rectifying liquid extracted by drain s1 from the upper convolution of coil S.

The rectifying liquid for convolution 4 of said coil D6 is derived from convolutions 3 and 4 of coil D7 through ducts p7, and the convolutions 1 and 2 of coil D7 feed convolution 3 of coil D6 through duct po.

Each drain of a convolution of the coil D6 provides the rectifying liquid for a corresponding convolution in the coil D5, as will be understood readily without the application of reference characters to the connecting ducts.

The rectification of convolution 2 of said coil D4 is fed by the liquids separated in convolutions 3 and 4 of coil D5, and the rectification of convolution 1 of coil D4 is fed by the liquids separated in convolutions 2 and 1 of coil D5. The rectifications of the convolutions 3 and 4 of coil D4 are fed by the liquid that is to be distilled.

From this point on, the liquids separated in each convolution of a coil feed the rectification in a corresponding convolution in the next lower coil, i. e., the rectifications of coil D3 are fed by the liquids from coil D4; the liquids from coil D3 feed the rectifications of coil D2; and the liquids from coil D2 feed the rectifications of coil D1.

Finally, the liquids exhausted after all of the foregoing rectification are extracted and delivered through tube p to the tank E where the volatile components which they contain are evaporated. This delivery may be effected by gravity, as indicated, or these liquids may be pumped if the pressure in E is too high for a gravity delivery.

The various arrangements for heating the liquid to be distilled; also for collection of the definitive products discharged from the lower convolutions of coil S, and also the structural details and connections peculiar to the second column shown at the right hand side of Fig. 16, may be, and preferably are, identical with like features described with reference to the apparatus illustrated in Fig. 15.

The rectification coil utilized with an ascending stream, as also the rectifying coil utilized with a descending stream, can be in various shapes; but the now-preferred shapes illustrated in Figs. 5, 6, 7 and 8 have the advantage that the surface over which the liquid flows from the inward to the outward walls of the bore is desirably extended, and consequently the time of contact of the fluids, during their curvilinear motion, is desirably prolonged.

Figs. 6, 7 and 8 represent coil sections which comply with the preferred arrangement whereby the provision of a sufficiently deep and narrow small collecting channel with rugose sides to enhance in a novel manner the efficiency of rectification to which reference has already been made; but it is to be understood that the invention may be carried into effect, even with less efficiency, by the use of tubes of other cross-section.

The rectifying coil can be totally curvilinear, with a constant or variable radius of curvature; it can also be made up of straight parts united to curvilinear parts, in the same way as the distillation coil; (see Figs. 9, 10, 11 and 12) but in such a case the function of the straight parts, or of parts having the greatest radius of curvature, would be the rectification proper, that is, the atomization of the rectifying liquid by the vapor to be rectified; and the concurrent separation of the residual or resultant liquid, effected subsequently to the rectification, would be effected in the more curved parts, i. e., those having a shorter radius.

In all of the rectifying operations, the coil must be completely insulated, exteriorly, to prevent a loss of heat which finally would represent a greater expenditure of steam in the distilling tank, or a lower yield in production. The drains also must be perfectly insulated, but the insulation at the upper part of the column can be reduced, if it is desired to obtain a more potent rectifying effect with a relatively small apparatus, even at the cost of a slight increase in the consumption of vapor.

Figure 17:
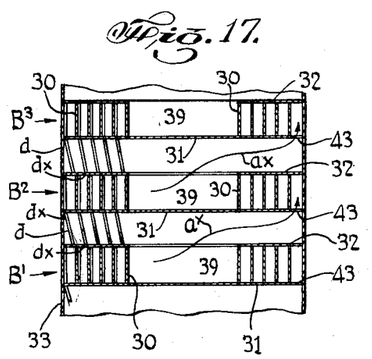
Fig. 17 is a schematic view, in vertical sectional elevation, of a rectifying column in which are embodied coils each formed in part by a strip of metal wound in convolutions.
Figure 18:
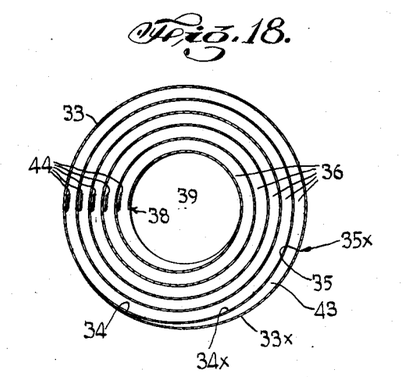
Fig. 18 shows the structure of Fig. 17 in horizontal section.

In Figs. 17 and 18, a third form of rectifying column is illustrated; Fig. 17 showing in vertical section a column comprising three successive stories, B', B2 and B3, which serves to illustrate a type of column which may have as many stories as found desirable and suitable to achieve any practical rectification effect.

Each story consists of a flat metallic strip 30 arranged in a horizontally disposed spiral and contained between cover discs 31 and 32, with which the outer wall 33 is contiguous along the whole surface enclosed between the wall 33 and the outmost spiral of the coil which begins at 34 (see Fig. 18), and from this point separates progressively from the wall 33 up to the region 35, 35x and thence defines inter-convolution spaces 36 consecutively spiral to the inner terminal 38 within which is an open central space 39. Consequently each cover disc 31 is open throughout the section defined by the circle portion 33x between 34 and 35x, the portion of the spiral 34x between 34 and 35, and the straight line between 35 and 35x, that is to say, the surface of the curvilinear triangular area 43, so defined, represents an inlet opening for vapors following the arrows designated AX respectively in Fig. 17, from story to story.

The upper cover, 32, on the contrary, covers in each story that surface comprised between the exterior side of the column 33 and the spiral; and it also covers all the area occupied by each spiral, but is open at the center 39, in the interior part of said spiral.

In this form of column, the vapor enters a story through the hollow peripheral part 43 of the lower cover 31, that is, through the entrance to the spiral at its outward part, flows through the successive convolutions of the spiral inwardly, to the space 39, and departs through the hollow center of the upper cover 32, within the column, to seek the entrance 43 to the immediately higher story.

Figure 19:
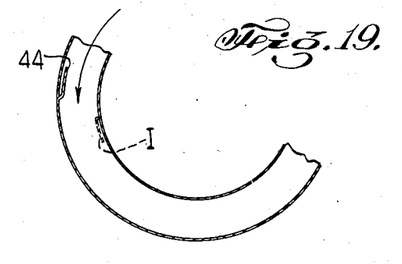
Fig. 19 is a schematic, fragmentary, detail view similar to Fig. 18, of certain of the means for effecting extractions and injections in a column of the type shown in preceding figures.

The extractions are made with spoon-like devices 44, of which one is shown at the inner face of each convolution of the spiral, both in Fig. 18 and in Fig. 19, and it may be assumed, for the sake of illustration, that when the liquid extracted by each spoon flows out from one spiral it is sent through the drains d to the corresponding spiral channel of the next lower story, entering at the upper, inner part of the spiral channel as shown clearly at dx in Fig. 17.

The drains d have been shown in schematic form in the drawings, and they actually follow the direction of the spiral when leaving the spoons respectively to go to the place of injection into the corresponding spiral of a lower story, in order to facilitate the course of the extracted liquid therein.

Each extracting spoon 44 is always disposed in advance of the region, as I, where rectifying liquid is to be injected, as shown in Fig. 19, from which it is clear that the extraction will take place before a new rectification.

Figure 20:
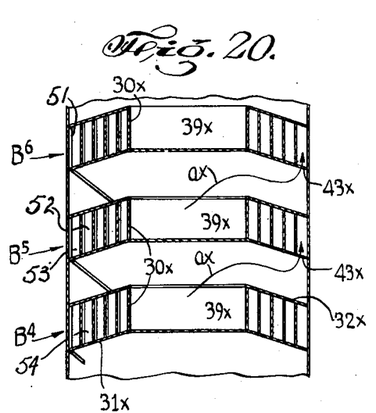
Fig. 20 illustrates, similarly to Fig. 17, part of a rectifying column fabricated with several stories, each in the form of a flat conical spiral.

Referring to Fig. 20, another form of column is illustrated which is similar to that shown in Figs. 17, 18 and 19, and described with reference thereto, but is formed with frusto-conical covers, as 31x and 32x.

Figure 21:
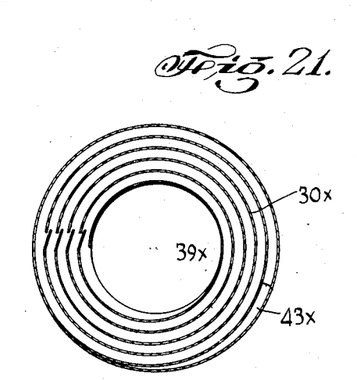
Fig. 21 is a view in horizontal section of the parts shown in Fig. 20.

In the structure shown in Figs. 20 and 21, several stories, B4, B5 and B6, formed of spirally wound strips 30x are illustrated, by way of example of a higher column made up of as many stories as found suitable and this structure corresponds in other general respects with that shown in Figs. 17 to 19, but with the modification that the several annular cover discs, as 31x and 32x are dished, or formed each as the frustum of a cone, the flow from story to story being indicated by the arrows ax in Fig. 20, and so that the flow ascends in a spiral from the outside toward the center.

The triangular inlets 43x in each lower cover disc 31x of a story are of like formation and purpose to those designated 43 in the structure already described (see Fig. 21).

A somewhat similar rectifying column (not shown) might be made up, in which the frusto-conical covers would be inverted so that the spiral would be arranged in descending form.

In this modified form of rectifying column, shown in Figs. 20 and 21, and also in the modification of Figs. 17 and 18, within each story, the injection of rectifying liquid, separated after rectification, may easily be effected from one spiral into the exterior contiguous spiral at its interior part, by opening the bottom of the small collecting channel.

The liquid extracted at the outermost spiral, as at 51 (see Fig. 20), would be injected into the penultimate interior spiral of a lower story, as at 52, for example, and through successive extractions and injections, it will be discharged from the outermost spiral 53 of that story into the penultimate internal spiral of the next lower story, as at 54, and thus being transferred or conducted from story to story it will eventually pass from the outermost spiral of the lowest story to an evaporating tank, such as E, already described with reference to Figs. 15 and 16.

The innermost final spiral in each of the stories, in multistory columns fabricated as in the Figures 20-21, can be devoted exclusively to separation of liquid entrained by the vapor, and consequently no liquid will be injected into any of said ultimate spirals.

Figure 22:
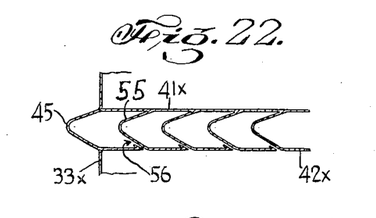
Fig. 22 is a fragmentary detail view on a larger scale, showing in cross-section a part of a rectifying tube embodying the invention.
Figure 23:
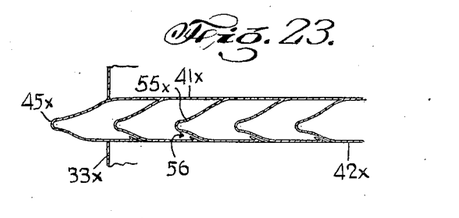
Fig. 23 is a similar view of a modification.

While the spiral channels of the structure shown in Fig. 17 are of rectangular cross-section, and those of Fig. 20 are of rhomboidal cross-section; other cross-sectional shapes can be utilized, as for example those shown in Figs. 22 and 23.

In the fabrication of spirals having the last-named cross-sectional shapes, a neck of flexible metal, as 55, can be soldered to the upper cover, as 41x, and may rest at its lower part, as at 56, on a small strip which is soldered to the lower cover, 42x, and projects therefrom, the connection between the neck and the small strip being loose, inasmuch as a sufficiently tight joint for the intended use is established by the pressure against the spiral strip engendered by the centrifugal force, applied by the circulating liquids. The form shown in Fig. 23 differs from that shown in Fig. 22 only in the shape of the channel 45x as compared with that designated 45, in Fig. 22.

Figure 24:
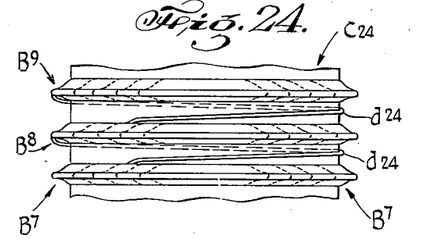
Figs. 24 and 25 represent in vertical and horizontal section, respectively, part of a rectifying column, which utilizes a coil of the shape shown in Fig. 23.
Figure 25:
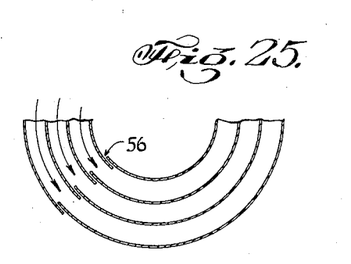

Fig. 24 represents in part three stories of a rectifying column C24 of the general type illustrated in Fig. 17 and whose coils, B7, B8 and B9, have the cross-section shown in Fig. 23, said column being formed as a channelled cylinder, and the successive stories thereof being constructed as described above with reference to Figs. 17-19. Drains d24 operate in the manner already described.

Figure 26:
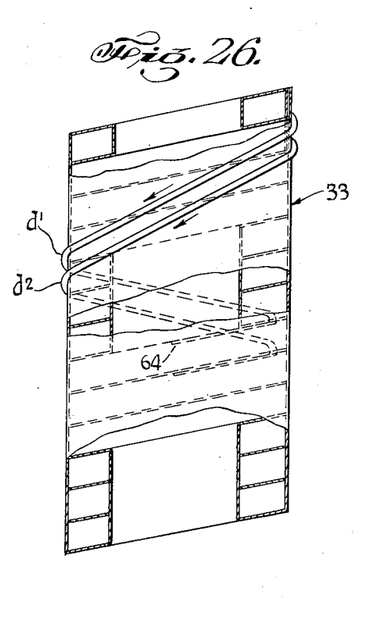
Figs. 26 and 27 are fragmentary detail views in elevation and plan respectively of parts illustrated in Fig. 15.
Figure 27:
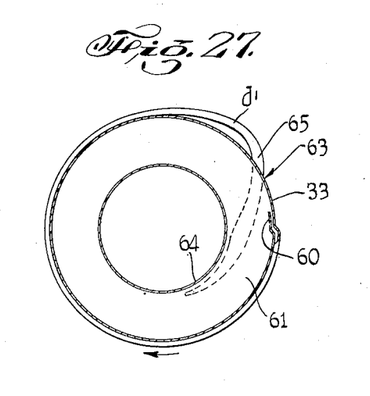

Figs. 26 and 27 illustrate in schematic form the preferred manner in which the extraction of liquids is effected from such coils as those shown in Fig. 15 and other forms which lend themselves to such extraction.

Referring to Fig. 27, 60 designates a narrow, spoon-like extracting device which projects slightly into the channel 61 in a direction contrary to the flow of the stream and is in communication with a duct, as d1, running in a helical formation around the exterior of the column 33, and piercing the wall thereof as at 62. The helix is developed in an oblique line with relation to the direction of flow of the stream in the coil, and forms an obtuse angle therewith.

The duct d1 preferably penetrates the wall at 63 at the upper exterior side of the channel, obliquely, as shown in Fig. 27, and thus deviates but little from the direction of flow of the stream, injecting the liquid near the inner wall 64 of the channel. The duct is flattened and increased in width as at 65, where it pierces the wall 63, in order to reduce to a minimum the obstacle which it creates to the rapid flow of the stream in the coil.

Fig. 26 shows two ducts, d1 and d2, for the above purpose, but one duct, or more than two ducts may be provided.

A single spoon-like extracting device dx, may, as already mentioned briefly, serve to extract, as shown schematically in Fig. 3, all of the liquids separated therein, and may deliver them into another convolution, or other convolutions, in a manner similar to that of Figs. 3 and 4, whether for distillation or rectification.

From the foregoing it will be understood that in general, the several forms of columns described will be operated preferably in accordance with the conditions illustrated and described with reference to the forms of apparatus in Figs. 15 and 16; that is, the rectifying liquid will in major part be constituted by the liquid to be distilled, the latter being introduced suitably into the rectifying column, more or less at the middle of its height, according to the larger or smaller proportion it may contain of the volatile constituents desired to be extracted by distillation; and the rectifying liquid used in the upper part of the column is provided by the first condensation of the rectified vapor which is delivered from the column and which continues to condense in a separating coil, in the manner described.

In the description of the various columns, it may be assumed that the cross-sectional area of the tube or channel is constant throughout the length of the coil, as indicated; but usually, in the case of alcoholic distillation, for example, the cross-sectional area must decrease progressively in order to maintain the velocity of flow, and consequently the efficiency of the rectification; because a volume of vapor which becomes condensed in such an operation of rectification is substituted by a stream of alcohol about one-third smaller in volume; and because the decrease of pressure does not generally compensate for that decrease in volume; and because the constant lowering of the temperature partially offsets the effect of the decrease of pressure.

In the apparatus of Fig. 15, for example, the cross-sectional area of the coil channel may be decreased either by diminishing the pitch of the spiral, or by making the exterior side of the column conical, as in Fig. 2 (inverted) or by both means.

In the apparatus of Fig. 16, the variations of sectional area can be effected in one of the ways first described with reference to distillation, even if in a much smaller proportion.

In the columns of Fig. 17 and of Fig. 20, or similar ones, the dimensions of the coil in each story may be sufficient to modify the section in steps from story to story.

The terms "fractional condensation" and "rectification" as used herein may be distinguished on the following basis:

The fractional condensation has as its object the division of a mixed vapor into elements and it is effected by means of the isolated extractions of the successive condensations that are produced within a total operation of the condensation of the mixed vapor.

Rectification has for its object the purification of a vapor and it is carried out through successive washings of this vapor by a rectifying liquid which travels the successive washings in inverse order of succession from that of the vapor to be purified, absorbing in this process the impurities of said vapor, each unitary operation causing an exchange between the vapor and the liquid of the constituent or constituents forming the desired end product and the diluent constituent or constituents, such that the disparity between the constitutions of the liquid and the vapor with respect to the desired end product is increased.

I have described what I believe to be the best embodiments of my invention. I do not wish, however, to be confined to the embodiments shown, but what I desire to cover by Letters Patent is set forth in the appended claims.

I claim:

1. The process of rectification concurrently with an operation of distillation; which process consists in the step of causing the vaporous products which are to be rectified to flow at a great velocity through the successive convolutions of a coil which is curvilinear in part at least; the step of injecting the rectifying liquid into said coil preferably at a part of its section toward the axial center of the coil, thus causing the atomization of said liquid by the stream of the vapor to be rectified, and by virtue of said operation effecting the intimate mixture of said vapor and said liquid, and the rectification of both; and as a concurrent step, effecting the separation of the rectified liquid in the curvilinear part of the coil by subjecting the vapor and liquid concurrently to an adequate moment of centrifugal force; the further step of extracting the separated rectified liquids by means of exterior drains which empty them from the system, and the step of thereafter effecting a new injection of a rectifying liquid richer in volatile constituents than the first preparatory for effecting a new rectification.

2. The process of rectification concurrently with an operation of distillation; which method consists in causing the vaporous products which are to be rectified to flow at a great velocity through the successive convolutions of a coil which is curvilinear in part at least; the step of subjecting those vapors during their course to successive rectifications by means of injections of rectifying liquid as provided in claim 1, in at least several of the convolutions of the coil, and utilizing for said rectification, in a convolution of that coil, liquids previously employed in a preceding rectification in a higher convolution through which the vapor flows in an opposed direction, so that the vapor becomes rectified in its course by successively purer liquids; and so that the liquid, on the contrary, in its descending motion, rectifies successively impurer vapors.

3. A process of rectification concurrently with an operation of distillation which comprises causing vaporous products which are to be rectified to flow through successive convolutions of a rectifying column which are curvilinear in part at least, at velocity sufficient to develop in the curvilinear parts a component of centrifugal force which is at least several times as great as the force of gravity, injecting liquid to be distilled as the primary rectifying liquid midway of the height of the column, but higher or lower according to the proportion which it may contain of the more volatile components which are to constitute the desired volatile end product of the rectification, while causing the atomization of the liquid, the intimate mixture of the liquid with the vapor and the entrainment of the liquid by the vapor, and by virtue of said operation effecting a step in the rectification of the liquid and the vapor, and the centrifugal separation of the partially rectified liquid from the column, and repeating the injection, atomization, entrainment and separation of the partially rectified liquid at successively lower points of the column for carrying out succeeding rectifying steps in the same manner as the first, whereby the liquid is caused to become continuously poorer and to reach the bottom of the column with the originally contained volatile products extracted in their greater part.

4. The process of rectification and condensation having the features claimed in claim 1, in which the liquid to be distilled is used as the principal rectifying fluid, and in which use is made of the process of centrifugal distillation herein described, to condense and to separate the successive vaporous components of progressively greater volatility which those vapors contain, and the step of returning to the rectifying coil, in order to feed the rectification of its higher convolutions, the condensates of the first convolutions of the condensing coil which analyses the rectified vapor, namely, its less volatile products, even if said rectifying coil might end with one or several convolutions free from injection of rectifying liquid, with the object of utilizing them in novel disposition to purge the circulating rectified vapor from entrained liquids.

5. The process of distillation in conjunction with an operation of rectification; said method consisting in the employment of the process of rectification and condensation as set forth in claim 3, and in utilizing the exhausted liquid to be distilled, when extracted from the lower convolutions of the rectifying coil, to produce the primitive vapor which flows through the rectifying column; and wherein the components of greater volatility which it contains are evaporated, united with other less volatile components which are separated in the rectifying column.

6. The process which consists in using multiple effects in conjunction with the process of rectification and condensation having the steps claimed in claim 3, in which a cooling operation is effected, by a liquid to be distilled, previously exhausted in another rectifying column operated at lower pressure, and in such a way that the condenser of a vaporous product may cause the evaporation of another moiety of liquid to be distilled.

7. The process of rectification comprising the steps of transmitting vapor to be rectified through successive turns of a volute spiral path from the outer toward the inner end of such path, and withdrawing liquid separated in one turn of the spiral and injecting it into the adjacent outer turn for rectification purposes.

JUAN LOUMIET Y LAVIGNE.

CERTIFICATE OF CORRECTION.

Patent No. 2,182,566. December 5, 1939.

JUAN LOUMIET y LAVIGNE.

It is hereby certified that error appears in the printed specification of the above numbered patent requiring correction as follows: Page 7, second column, line 68, claim 1, strike out the word "preparatory"; and that the said Letters Patent should be read with this correction therein that the same may conform to the record of the case in the Patent Office.

Signed and sealed this 16th day of January, A. D. 1940.

(Seal)

Henry Van Arsdale,
Acting Commissioner of Patents.